United States Patent [19]
Ling et al.

[11] Patent Number: 5,493,189
[45] Date of Patent: Feb. 20, 1996

[54] SOFT SWITCHING SCHEME FOR DRIVING THREE-PHASE BRUSHLESS DC MOTOR

[75] Inventors: Kuok Y. Ling, Coppell; William Krenik, Garland, both of Tex.

[73] Assignee: Texas Instruments Incorporated, Dallas, Tex.

[21] Appl. No.: 169,871

[22] Filed: Dec. 17, 1993

[51] Int. Cl.$^6$ .................................................. H02P 1/18
[52] U.S. Cl. ............................................. 318/254; 318/439
[58] Field of Search ........................................ 318/138, 254, 318/439

[56] References Cited

U.S. PATENT DOCUMENTS

| | | | |
|---|---|---|---|
| 3,631,262 | 12/1971 | Jarrett | 307/229 |
| 5,191,269 | 3/1993 | Carbolante | 318/254 |
| 5,204,593 | 4/1993 | Uehi | 318/254 |
| 5,210,474 | 5/1993 | Oswald | 318/254 |
| 5,397,967 | 3/1995 | Carbolante et al. | 318/254 |

*Primary Examiner*—Brian Sircus
*Attorney, Agent, or Firm*—Alan K. Stewart; Richard L. Donaldson; William E. Hiller

[57] ABSTRACT

A switching scheme for driving a three-phase DC motor includes a first end of a first coil 20 coupled to a first end of a second coil 22 and a first end of a third coil 24. A first high side transistor 32 is coupled between a voltage source and a second end of the first coil 20. A second high side transistor 34 is coupled between the voltage source and a second end of the second coil 22. A third high side transistor 36 is coupled between the voltage source and a second end of the third coil 24. A first low side transistor 38 is coupled between the second end of the first coil 20 and a resistor 56. A second low side transistor 40 is coupled between the second end of the second coil 22 and the resistor 56. A third low side transistor 42 is coupled between the second end of the third coil 24 and the resistor 56. An output of a first low side driver 26 is coupled to a gate of the first low side transistor 38. An output of a second low side driver 28 is coupled to a gate of the second low side transistor 40. An output of a third low side driver 30 is coupled to a gate of the third low side transistor 42. A low side reference voltage is coupled to a first input of each of the three low side drivers 26, 28, and 30. The resistor 56 is coupled to a second input of each of the low side drivers 26, 28, and 30. Pre-charge circuitry 64 is coupled to the output of each of the three low side drivers 26, 28, and 30. The pre-charge circuitry 64 provides a pre-charge signal to each of the three low side drivers 26, 28, and 30.

18 Claims, 1 Drawing Sheet

SOFT SWITCHING SCHEME FOR DRIVING THREE-PHASE BRUSHLESS DC MOTOR

FIELD OF THE INVENTION

This invention generally relates to DC motors and, more particularly, to switching schemes for driving three-phase brushless DC motors.

BACKGROUND OF THE INVENTION

Without limiting the scope of the invention, its background is described in connection with three-phase brushless DC motors. A common driving configuration for three-phase brushless DC motors, which are wound as a "Y", uses current drive with one precision external resistor. The three windings in the motor are labeled as the U, V, and W coils. The motor has a high side switch for each of the three coils. The motor also has a low side regulator for each of the three coils. In operation, current is switched from one winding to another by switching the high side switches or the low side regulators. The timing of the switching is determined by the zero-crossing of the back EMF voltage of the undriven coil. After each commutation, either high side current or low side current, delayed inductive voltage spikes occur.

SUMMARY OF THE INVENTION

It has been discovered that delayed inductive voltage spikes after a commutation, which could interfere with back EMF zero-crossing detection used to generate commutation signal, is a problem.

Generally, and in one form of the invention, a switching scheme for driving a three-phase DC motor includes a first end of a first coil coupled to a first end of a second coil and a first end of a third coil. A first high side transistor is coupled between a voltage source and a second end of the first coil. A second high side transistor is coupled between the voltage source and a second end of the second coil. A third high side transistor is coupled between the voltage source and a second end of the third coil. A first low side transistor is coupled between the second end of the first coil and a resistor. A second low side transistor is coupled between the second end of the second coil and the resistor. A third low side transistor is coupled between the second end of the third coil and the resistor. An output of a first low side driver is coupled to a gate of the first low side transistor. An output of a second low side driver is coupled to a gate of the second low side transistor. An output of a third low side driver is coupled to a gate of the third low side transistor. A low side reference voltage is coupled to a first input of each of the three low side drivers. The resistor is coupled to a second input of each of the low side drivers. Pre-charge circuitry is coupled to the output of each of the three low side drivers. The pre-charge circuitry provides a pre-charge signal to each of the three low side drivers.

One advantage of this invention is that for a given amount of time to switch from one winding to another, this embodiment induces less voltage spikes than others at minimal additional cost (silicon area, power consumption, and complexity) above a simple soft-switching scheme.

BRIEF DESCRIPTION OF THE DRAWINGS

In the drawings:

FIG. 3 is a plot of the gate voltage used in the preferred embodiment for switching the high side transistors on.

Corresponding numerals and symbols in the different figures refer to corresponding parts unless otherwise indicated.

DETAILED DESCRIPTION OF PREFERRED EMBODIMENTS

Figure 1:
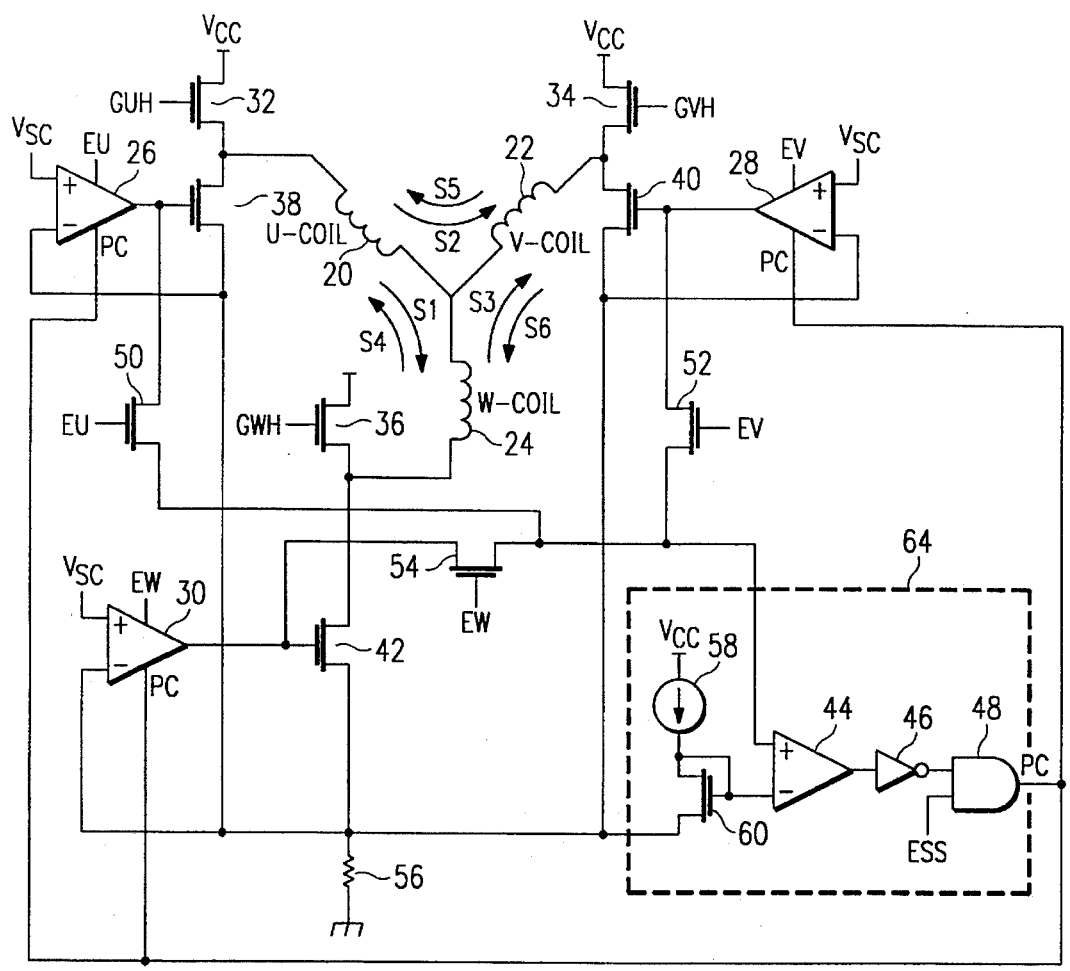
FIG. 1 is a circuit diagram of a preferred embodiment soft switching scheme for driving three-phase brushless DC motors.

FIG. 1 is a circuit diagram of a preferred embodiment soft switching scheme for driving three-phase brushless DC motors. The circuit of FIG. 1 includes a three-phase brushless DC motor with U-coil 20, V-coil 22, and W-coil 24, U low side driver 26, V low side driver 28, and W low side driver 30, U high side transistor 32, V high side transistor 34, and W high side transistor 36, U low side transistor 38, V low side transistor 40, and W low side transistor 42, pre-charge comparator 44, pre-charge inverter 46, pre-charge "and" gate 48, pre-charge switch transistors 50, 52, and 54, external resistor 56, pre-charge reference current source 58, pre-charge reference transistor 60, voltage source $V_{cc}$, low side driver input voltage $V_{sc}$, U low side driver enable signal EU, V low side driver enable signal EV, W low side driver enable signal EW, V high side transistor gate voltage GVH, U high side transistor gate voltage GUH, W high side transistor gate voltage GWH, pre-charge enable signal ESS, and pre-charge signal PC.

The brushless motor circuit of FIG. 1 has six operation states as shown by the arrows S1, S2, S3, S4, S5, and S6. The arrows show the direction of current flow for each state. In operation, the motor switches through the six states in sequence. The motor switches from one operation state to the next after each sixty electrical degree rotation.

Starting with the motor in operation state S6, the switching sequence of the motor is described. At the end of state S6, the motor is switched to state S1. For state S1, V high side transistor 34 is switched off by gate voltage GVH, W low side transistor 42 remains on, and U high side transistor 32 is switched on by gate voltage GUH. After a sixty degree rotation, the motor switches to operation state S2. For state S2, U high side transistor 32 remains on, W low side transistor 42 is switched off, and V low side transistor 40 is switched on. This allows current to flow in the direction shown by arrow S2. After another sixty degree rotation, the motor switches to operation state S3. For state S3, the U high side transistor 32 is switched off, V low side transistor 40 remains on, and W high side transistor 36 is switched on by gate voltage GWH. This allows current to flow in the direction shown by arrow S3. After another sixty degree rotation, the motor switches to operation state S4. For state S4, W high side transistor 36 remains on, V low side transistor 40 is switched off, and U low side transistor 38 is switched on. This allows current to flow in the direction shown by arrow S4. After another sixty degree rotation, the motor switches to operation state S5. For state S5, W high side transistor 36 is switched off, U low side transistor 38 remains on, and V high side transistor 34 is switched on by gate voltage GVH. This allows current to flow in the direction shown by arrow S5. After another sixty degree rotation, the motor switches to operation state S6. In state S6, V high side transistor 34 remains on, U low side transistor 38 is switched off, and W low side transistor 42 is switched on. This allows current to flow in the direction shown by arrow S6.

When the motor switches from operation state S1 to S2, S3 to S4, and S5 to S6, the low side current is switched from one coil to another. The low side current is switched by switching off the low side driver of one coil and switching on the low side driver of another coil. When switching low-side current, the current in the first coil has to decrease before the low side driver for the second coil sees a differential input voltage to cause the gate voltage of the second low side transistor to rise. Also, the low side transistor does not start to conduct until its gate to source voltage ($V_{gs}$) reaches the threshold voltage ($V_{th}$), while the current in the first coil starts to decrease as soon as it is commanded to do so.

Torque ripple in the motor, which is highly undesirable when cruising, is maximized if the current in the first coil reaches zero before the second coil starts conducting. To avoid torque ripple in the preferred embodiment, the low side transistor for the second coil is pre-charged to the threshold voltage and the turn off of the other low-side transistor is delayed. The pre-charging stops when $V_{gs}$ of the low side transistor for the second coil goes above $V_{th}$ of the transistor. The other low side transistor begins to turn off when the pre-charging stops. Torque ripple is minimized this way, provided the slew rates for turning on and off are made about equal.

In the preferred embodiment, a pre-charge signal is provided by the pre-charge circuitry 64, shown in FIG. 1. The pre-charge circuitry 64 includes pre-charge reference voltage circuitry coupled to the negative input terminal of the comparator 44. The pre-charge reference voltage circuitry consists of a pre-charge reference current source 58 and a pre-charge reference transistor 60. The pre-charge reference voltage is approximately equal to the threshold voltage $V_{th}$ of the low side transistors 38, 40, and 42. The positive terminal of the pre-charge comparator 44 is coupled to a gate of one of the low side transistors 38, 40, and 42 when one of the pre-charge switch transistors 50, 52, and 54 is turned on. The other low side driver, the one that is about to be turned off, will be kept on by the pre-charge circuit 64 until the gate voltage of the selected low side transistor is above the threshold voltage $V_{th}$.

Referring to FIG. 1, an example of low side switching is described. In switching from operation state S1 to operation state S2, the low side current is switched from the W-coil 24 to the V-coil 22. The switching begins by switching control signal EV on and control signal EW off. The signal EW activates the W low side driver 30 and the pre-charge switch transistor 54. The signal EV activates the V low side driver 28 and the pre-charge switch transistor 52. The low side drivers 26, 28, and 30 are also independently activated by the pre-charge signal PC. When EW is switched off, the W low side driver 30 remains activated because PC is on. When EV is switched on, the output voltage of the V low side driver 28 begins to rise. When this voltage goes above the threshold voltage $V_{th}$ of the V low side transistor 40, the pre-charge circuit turns off the W low side driver 30. By delaying the turn off of the W low side driver 30 with the pre-charge circuitry 64, V low side transistor 40 is turning on when W low side transistor 42 is turning off. This minimizes torque ripple because current is increasing in the V coil 22 as current in the W coil 24 is decreasing at the same rate.

When the motor switches from state S2 to S3, S4 to S5, and S6 to S1, the high side current is switched from one coil to another. The high side current is switched by switching off one high side transistor and switching on another high side transistor. Switching high side current causes delayed inductive voltage spikes on the coil that is being turned off after a commutation. This can interfere with back EMF zero-crossing detection used to generate commutation signal. The delay happens when the run current is low, which is the case when the motor is cruising. At low run current, the low-side transistor's gate is at a low voltage, typically around 2 volts. The high-side transistors are acting as switches which are either turned full-on or completely off through constant current sources. Hence, when turning off a high-side transistor, the "on" resistance of the transistor increases. However, since the low side driver is regulating the motor's run current, it will just raise the gate voltage of the low-side transistor in order to keep the current constant. Since the coil current is kept constant, no inductive voltage spike is induced. This will continue until the low-side gate reaches the upper rail (VDD) which is typically charge-pumped to about 15 volts. Then a voltage spike will be induced.

One way to reduce the magnitude of the inductive voltage spikes is to reduce the rate of change of the "on" resistance when switching off the high side transistors. This can be accomplished by slowly changing the gate voltage of the high side transistor. However, even though the slower change of the gate voltage provides a smaller voltage spike, the spike is moved further out in time. This can cause interference with back EMF zero-crossing detection used to generate commutation signal. Therefore, in order to reduce the voltage spike, while at the same time not moving it too far out in time, the gate voltage can have a gradual slope in the region where the "on" resistance changes the most, and a steep slope in the region where the "on" resistance changes the least. The "on" resistance changes only a small amount when the gate voltage changes from the "on" voltage to about halfway to the "off" voltage. Then, as the gate voltage moves from the halfway point to the "off" voltage, the "on" resistance changes by a large amount.

Figure 2:
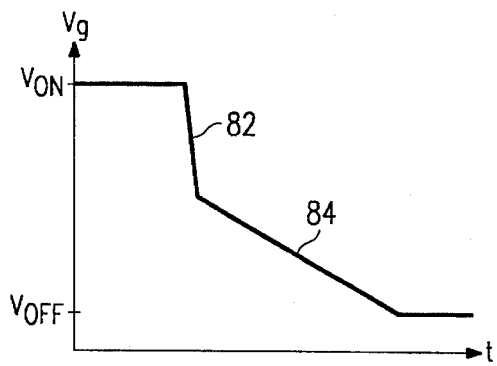
FIG. 2 is a plot of the gate voltage used in the preferred embodiment for switching the high side transistors off.
Figure 3:
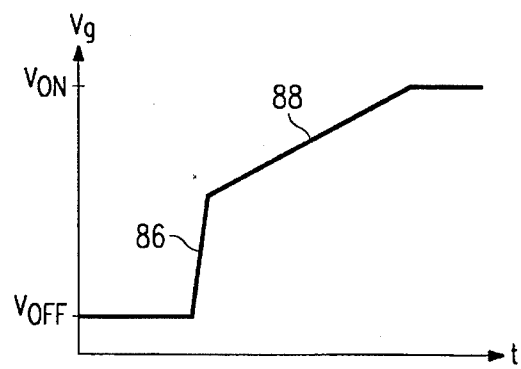

In the preferred embodiment, two voltage slopes are used in turning off the high side transistors, as shown in FIG. 2. The two slopes consist of a steep slope 82 to about halfway, followed by a gradual slope 84 the rest of the way. The steep slope 82 for about halfway is not a problem because the "on" resistance does not increase very much in this voltage range. Then the gradual slope 84 is used in the region where the "on" resistance increases the most. This strategy can also be used to turn off the low side drivers if the low side gate voltage has to slew a long way fast. When turning on a high side transistor, the gate voltage shown in FIG. 3 can be used. The steeper slope 86 is used to about halfway to $V_{on}$, followed by the gradual slope 88 the rest of the way. This reduces torque ripple during switching and does not load the charge pump unnecessarily since the slew currents come from VDD.

One advantage of this preferred embodiment is that for a given amount of time to switch from one coil to another, this embodiment induces lesser voltage spikes than others at minimal additional cost (silicon area, power consumption, and complexity) above a simple soft-switching scheme.

A preferred embodiment has been described in detail hereinabove. It is to be understood that the scope of the invention also comprehends embodiments different from that described, yet within the scope of the claims.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A switching circuit for driving a three-phase DC motor comprising:

a first coil, second coil, and third coil of the DC motor, a first end of the first coil is coupled to a first end of the second coil and a first end of the third coil;

a first high side transistor, a second high side transistor, and a third high side transistor, the first high side transistor is coupled between a voltage source and a second end of the first coil, the second high side transistor is coupled between the voltage source and a second end of the second coil, the third high side transistor is coupled between the voltage source and a second end of the third coil;

a first low side transistor, a second low side transistor, and a third low side transistor, the first low side transistor is coupled between the second end of the first coil and a resistor, the second low side transistor is coupled between the second end of the second coil and the resistor, the third low side transistor is coupled between the second end of the third coil and the resistor;

a first low side driver, a second low side driver, and a third low side driver, an output of the first low side driver is coupled to a gate of the first low side transistor, an output of the second low side driver is coupled to a gate of the second low side transistor, an output of the third low side driver is coupled to a gate of the third low side transistor, a low side reference voltage is coupled to a first input of each of the three low side drivers, the resistor is coupled to a second input of each of the low side drivers; and pre-charge circuitry coupled to the output of each of the three low side drivers, the pre-charge circuitry provides a pre-charge signal to each of the three low side drivers for reducing torque ripple.

2. The device of claim 1 wherein the pre-charge circuitry comprises:

a first switch, a second switch, and a third switch, a first end of the first switch coupled to the output of the first low side driver, a first end of the second switch coupled to the output of the second low side driver, and a first end of the third switch coupled to the output of the third low side driver;

a comparator, a first input of the comparator coupled to a second end of the first, second, and third switches; and threshold reference voltage circuitry coupled to a second input of the comparator.

3. The device of claim 2 further comprising output logic circuitry coupled to an output of the comparator for providing the pre-charge signal.

4. The device of claim 2 wherein the first switch is turned on when the first low side driver is turned on, the second switch is turned on when the second low side driver is turned on, and the third switch is turned on when the third low side driver is turned on.

5. The device of claim 2 wherein the switches are transistors.

6. The device of claim 2 wherein the threshold reference voltage circuitry comprises:

a current source; and a transistor coupled between the current source and the resistor, a drain and a gate of the transistor is coupled to the second input of the comparator and to the current source.

7. The device of claim 3 wherein the output logic circuitry comprises:

an inverter, an input of the inverter is coupled to the output of the comparator; and an "and" gate, a first input of the "and" gate is coupled to an output of the inverter, a second input of the "and" gate is coupled to a pre-charge activation signal.

8. The device of claim 1 wherein the three low side drivers are amplifiers.

9. The device of claim 1 wherein the high side transistors are turned on by a gate voltage having at least two voltage slopes.

10. The device of claim 1 wherein the high side transistors are turned off by a gate voltage having at least two voltage slopes.

11. A switching circuit for driving a three-phase DC motor comprising:

a first coil, a second coil, and a third coil of the DC motor, a first end of the first coil is coupled to a first end of the second coil and a first end of the third coil;

a first high side transistor, a second high side transistor, and a third high side transistor, the first high side transistor is coupled between a voltage source and a second end of the first coil, the second high side transistor is coupled between the voltage source and a second end of the second coil, the third high side transistor is coupled between the voltage source and a second end of the third coil, the high side transistors are turned off by a gate voltage having at least two slopes;

a first low side transistor, a second low side transistor, and a third low side transistor, the first low side transistor is coupled between the second end of the first coil and a resistor, the second low side transistor is coupled between the second end of the second coil and the resistor, the third low side transistor is coupled between the second end of the third coil and the resistor; and a first low side driver, a second low side driver, and a third low side driver, an output of the first low side driver is coupled to a gate of the first low side transistor, an output of the second low side driver is coupled to a gate of the second low side transistor, an output of the third low side driver is coupled to a gate of the third low side transistor, a reference voltage is coupled to a first input of each of the three low side drivers, the resistor is coupled to a second input of each of the low side drivers.

12. The device of claim 11 wherein the at least two slopes include a steep slope followed by a gradual slope.

13. The device of claim 11 wherein the high side transistors are turned on by a gate voltage having at least two slopes.

14. The device of claim 13 wherein the at least two slopes include a steep slope followed by a gradual slope.

15. The device of claim 11 wherein the three low side drivers are amplifiers.

16. The device of claim 11 wherein each of the three low side drivers has an enable input.

17. The device of claim 16 wherein each enable input is controlled such that when one low side driver is being enabled, another is being disabled.

18. The device of claim 11 further comprising a pre-charge circuit for pre-charging the low side drivers.

* * * * *